United States Patent
Aoki (10) Patent No.: US 8,649,092 B2
(45) Date of Patent: Feb. 11, 2014

(54) SCREEN AND SCREEN UNIT

(75) Inventor: Kazuo Aoki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/544,762

(22) Filed: Jul. 9, 2012

(65) Prior Publication Data

US 2013/0027771 A1 Jan. 31, 2013

(30) Foreign Application Priority Data

Jul. 25, 2011 (JP) .................................. 2011-161717

(51) Int. Cl.
*G03B 21/56* (2006.01)

(52) U.S. Cl.
USPC ........................................................ 359/461

(58) Field of Classification Search
USPC ......................................... 359/461, 443, 507
See application file for complete search history.

(56) References Cited

U.S. PATENT DOCUMENTS

| 5,337,179 | A | * | 8/1994 | Hodges | ......................... | 359/443 |
| 5,778,580 | A | * | 7/1998 | Zarelius | ......................... | 40/610 |
| 7,911,695 | B2 | * | 3/2011 | Maruta et al. | ................. | 359/461 |

FOREIGN PATENT DOCUMENTS

| JP | 09-311385 | 12/1997 |
| JP | 2007-328111 | 12/2007 |
| JP | 2008-122811 | 5/2008 |

\* cited by examiner

*Primary Examiner* — Christopher Mahoney
(74) *Attorney, Agent, or Firm* — Workman Nydegger (57) ABSTRACT

A screen reflects projection light for display. The screen has a screen base designed to be wound and including a first surface (front surface) and a second surface (rear surface) on the side opposite to the front surface. The front surface contains a display area that has a reflection film on which the projection light is reflected. The screen further has a flexible protection member which is disposed on the portion of the rear surface corresponding to the outside of the display area in the width direction of the display area, and extends through substantially the full length of the display area in the winding direction of the display area. The front surface is positioned outside when the screen base is wound.

20 Claims, 4 Drawing Sheets

SCREEN AND SCREEN UNIT

BACKGROUND

1. Technical Field

The present invention relates to a screen and a screen unit.

2. Related Art

A screen unit known in the art has a screen which reflects light projected from a projection type display apparatus such as a projector for display of an image on the screen. There is disclosed in JP-A-2007-328111, a screen which has a first winding step preventing member and a second winding step preventing member disposed at one and the other ends of the rear surface of the screen, respectively, in the direction perpendicular to the direction where a screen main body and a non-screen body are joined and arranged side by side. Each of the first and second winding step preventing members is located at a position not overlapping with the junction area between a first end and a second end of the two bodies. According to this structure, the screen can be wound for storage with no linear winding wrinkles produced along the step of the junction area between the screen main body and the non-screen body. Thus, the flatness of the screen improves in the condition of use.

In general, under the winding condition of a winding-type screen, the front surface of the screen overlaps with and the rear surface. Thus, when projections or the like are provided on the front surface of the screen so as to allow coating of a projection light reflection film on the front surface, these projections come into contact with the rear surface. In this case, the projections in contact with the rear surface scrape against the rear surface, whereby a part of the projections collapse in their shapes and leave scratches on the external appearance of the reflection film. These scratches on the reflection film adversely affect normal reflection of the light projected from the projector, and cause abnormal display of the image. In addition, in the case of the structure which includes an extension screen base joined to a screen containing a reflection film, similar problems occur due to the contact between the projections and the edge of the junction area.

According to the screen disclosed in JP-A-2007-328111, when the screen is wound, the overlap between the front surface and the rear surface of the screen is avoided in the area of the screen where the first winding step preventing member and the second winding step preventing member are provided. In this case, scraping between the reflection film and the edge of the junction area does not occur. However, in the area where the winding step preventing members are not provided, the front surface and the rear surface of the screen overlap with each other, wherefore similar problems arise.

Generally, in the case of the screen which allows contact between the front surface and the rear surface in the winding condition, the front surface and the rear surface repeatedly contact each other and separate from each other along with the repetitive winding and expanding (draw out) actions of the screen. In this case, the screen is easily made electrostatically charged, and allows dust contained in the use environment to adhere to the front surface and the rear surface of the screen. As a result, the reflectance of the reflection film decreases.

Accordingly, such a screen and a screen unit have been demanded which can protect the area for reflection or transmission of the projection light from damage in the winding condition of the screen.

SUMMARY

An advantage of some aspects of the invention is to provide a technology capable of solving at least a part of the aforementioned problems and the invention can be implemented as the following forms or application examples.

Application Example 1

This application example of the invention is directed to a screen which reflects projection light for display and includes: (1) a screen base designed to be wound and including a first surface which reflects the projection light for display, and a second surface disposed on the side opposite to the first surface; and (2) a flexible protection member disposed on the second surface and extending through substantially the full length of the screen base in the winding direction of the screen base. The first surface is positioned outside when the screen base is wound.

According to the screen having this structure, the protection member provided on the second surface and extending through substantially the full length of the screen base in the winding direction is sandwiched between the first surface and the second surface when the screen base is wound. In this case, contact between the first surface and the second surface in the winding condition is avoided, wherefore damage to the first surface functioning as a portion for reflecting the projection light can be prevented. Moreover, the first surface positioned outside in the winding condition is not damaged by the edge of the screen base. Furthermore, since the screen is wound without direct contact between the first surface and the second surface, the screen base is not electrostatically charged even after repetitive winding and expansion (drawing out) actions. Thus, dust contained in the use environment does not adhere to the first surface and the second surface of the screen base.

Application Example 2

This application example of the invention is directed to a screen which reflects or transmits projection light for display and includes: (1) a screen base designed to be wound and including a first surface which contains a display area that has a reflection film on which the projection light is reflected or a transmission surface through which the projection light is transmitted, and a second surface disposed on the side opposite to the first surface; and (2) a flexible protection member which is disposed on the portion of the second surface corresponding to the outside of the display area in the width direction of the display area, and extends through substantially the full length of the display area in the winding direction of the screen display area. The first surface is positioned outside when the screen base is wound.

According to the screen having this structure, the first surface has the display area containing the reflection film or the transmission surface. When the screen base is wound, the portion of the first surface corresponding to the display outside area comes into contact with the protection member. In this case, the portion of the first surface corresponding to the display area is wound with a clearance left between the display area and the second surface. Thus, contact between the display area and the second surface is avoided in the winding condition of the screen, wherefore the display area functioning as a portion for reflecting or transmitting the projection light can be protected from damage.

Application Example 3

It is preferable that the screen according to the above application example of the invention further includes a flexible supplementary base designed to be wound and connected to one end of the screen base in the winding direction of the screen base.

According to the screen having this structure, the supplementary base is connected to the screen base. Thus, the height of the first surface or the display area can be adjusted to a predetermined height by the use of the supplementary base when the screen assembled to a screen unit of a type placed on a floor, for example, is wound or expanded.

Application Example 4

It is preferable that one end of the supplementary base of the screen according to the above application example of the invention is connected to the one end of the second surface of the screen base, and that the protection member is disposed in the vicinity of the surface of the one end of the supplementary base.

According to the screen having this structure, the supplementary base is connected to the second surface of the screen base, while the protection member is disposed in the vicinity of the surface of the one end of the supplementary base. Thus, the supplementary base is not damaged by its own edge at the one end when the supplementary base is wound. Generally, the junction area between the supplementary base and the screen base has a step in the thickness direction. When the junction area having such a step is left wound for a long period, linear bends are produced at the overlapping position between the screen base and the step. In this case, the flatness of the screen base decreases at the time of use, causing distortion of an image formed by the projection light. According to the structure of this application example which has the protection member in the vicinity of the face of the one end of the supplementary base, however, the junction area between the supplementary base and the screen base elastically deforms the protection member in the winding condition of the screen, while producing a clearance between the junction area and the protection member. In this case, the step becomes lower in the winding condition of the screen, and bends produced by the step decrease. Accordingly, the flatness of the screen base improves.

Application Example 5

It is preferable that one end of the supplementary base of the screen of the above application example of the invention is connected to the one end of the second surface of the screen base, and that the protection member is provided on an area including the junction between the screen base and the supplementary base.

According to the screen having this structure, the protection member is provided on the area including the junction between the supplementary base and the second surface of the screen base. In this case, the supplementary base is not damaged by its own edge at the one end when the supplementary base is wound. Moreover, similarly to Application Example 4, bends produced by the step decrease, and the flatness of the screen base improves.

Application Example 6

It is preferable that the protection member of the screen of the above application example of the invention is made of elastic material.

According to the screen having this structure, the protection member is made of elastic material to function as a cushioning member. In this case, the protection member appropriately deforms when the screen base is wound. Thus, the first surface of the screen base in contact with the protection member can be protected from damage.

Application Example 7

This application example of the invention is directed to a screen unit including: the screen according to any of the above application examples of the invention; a winding mechanism around which the screen is wound; and an expanding and contracting mechanism which expands and contracts in cooperation with the winding mechanism to wind and draw out the screen.

According to the screen unit of this application example of the invention, the screen providing the foregoing advantages includes the winding mechanism and the expanding and contracting mechanism. Thus, the screen can be drawn out and expanded for use, and wound for compact storage at the end of use. Moreover, the first surface or the display area of the screen base is protected from damage when the screen is wound. Furthermore, bends produced by the step of the junction decrease, and the flatness of the screen base improves. Accordingly, the screen unit of this application example of the invention can reflect or transmit projection light in a more preferable condition.

BRIEF DESCRIPTION OF THE DRAWINGS

The invention will be described with reference to the accompanying drawings, wherein like numbers reference like elements.

DESCRIPTION OF EXEMPLARY EMBODIMENTS

An exemplary embodiment is hereinafter described with reference to the drawings.

Figure 1:
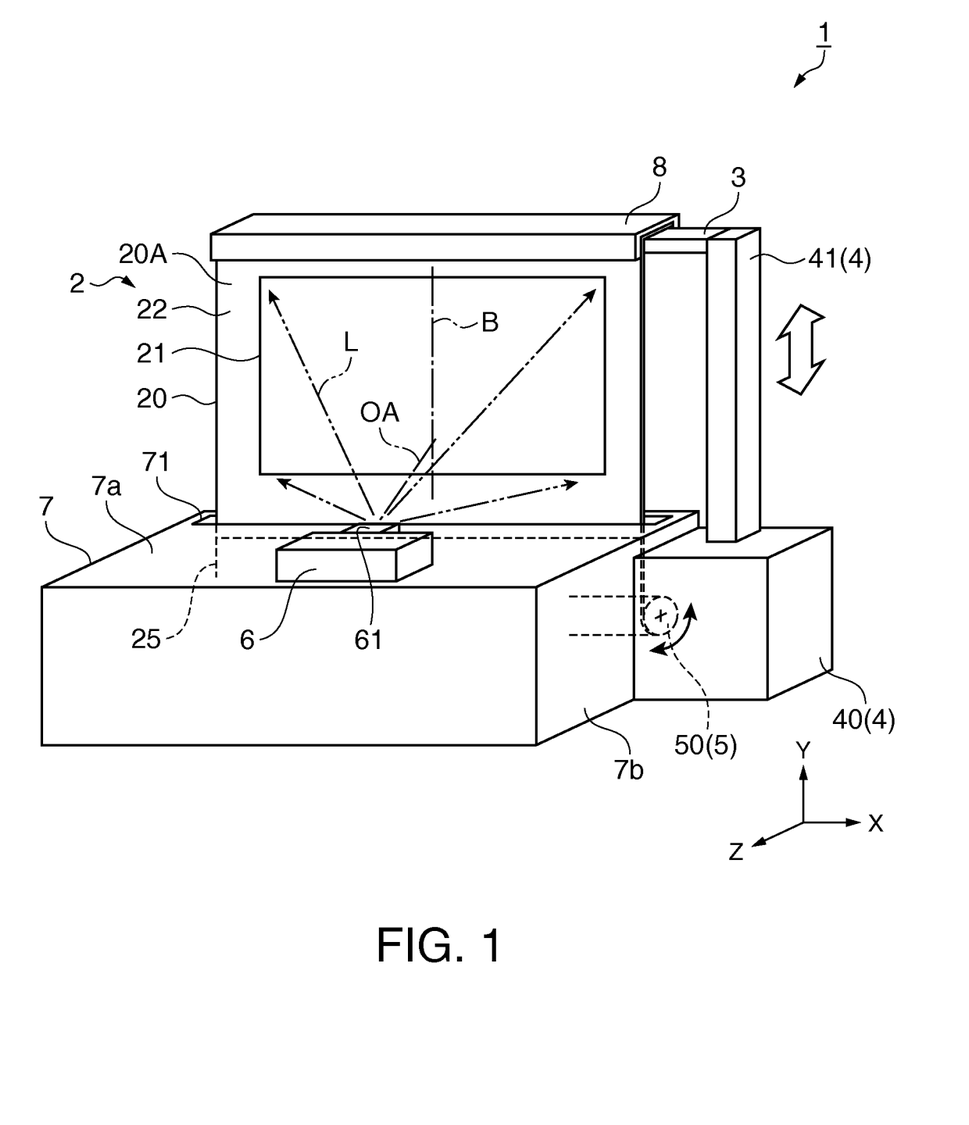
FIG. 1 schematically illustrates a screen unit according to an embodiment.

FIG. 1 schematically illustrates a screen unit 1 according to an embodiment. The general structure of the screen unit 1 in this embodiment is now briefly explained in conjunction with FIG. 1.

The screen unit 1 according to this embodiment is a reflection type screen unit placed on a floor surface or the like for use. The screen unit 1 comes into a condition for use when a substantially rectangular screen 2 of the screen unit 1 is drawn out in the upward direction (direction substantially perpendicular to the floor surface) from the inside of a rectangular parallelepiped and box-shaped housing 7 in accordance with the cooperative actions of an expanding and contracting mechanism 4 and a winding mechanism 5 so as to stand on the floor surface. In this condition, the screen 2 reflects projection light L received from a projector 6 attached to the housing 7 such that the projection light L can travel toward an observer. The details of the screen unit 1 will be described later.

In the respective figures to be referred to in the following explanation including FIG. 1, the dimensions and proportions of the respective components and elements are different from the actual ones so that these components and elements have sizes easily recognizable in the figures. Moreover, the respective figures to be referred to herein including FIG. 1 use XYZ rectangular coordinate system for convenience of explanation. According to this coordinate system, the Y direction corresponds to the vertical direction with respect to the floor surface, the X direction corresponds to the direction parallel with a front surface 20A of the standing screen 2 and perpendicular to the Y direction, and the Z direction corresponds to the direction perpendicular to both the Y direction and the X direction.

The direction of gravity along the Y direction (−Y direction) corresponds to the downward direction, while the direction opposite to the direction of gravity (+Y direction) corresponds to the upward direction. The +X direction as viewed from the front surface 20A of the standing screen 2 corresponds to the rightward direction, while the −X direction corresponds to the leftward direction. The direction extending toward the front from the front surface 20A of the standing screen 2 (+Z direction) corresponds to the frontward direction, while the direction opposite to the +Z direction (−Z direction) corresponds to the rearward direction.

Figure 2A:
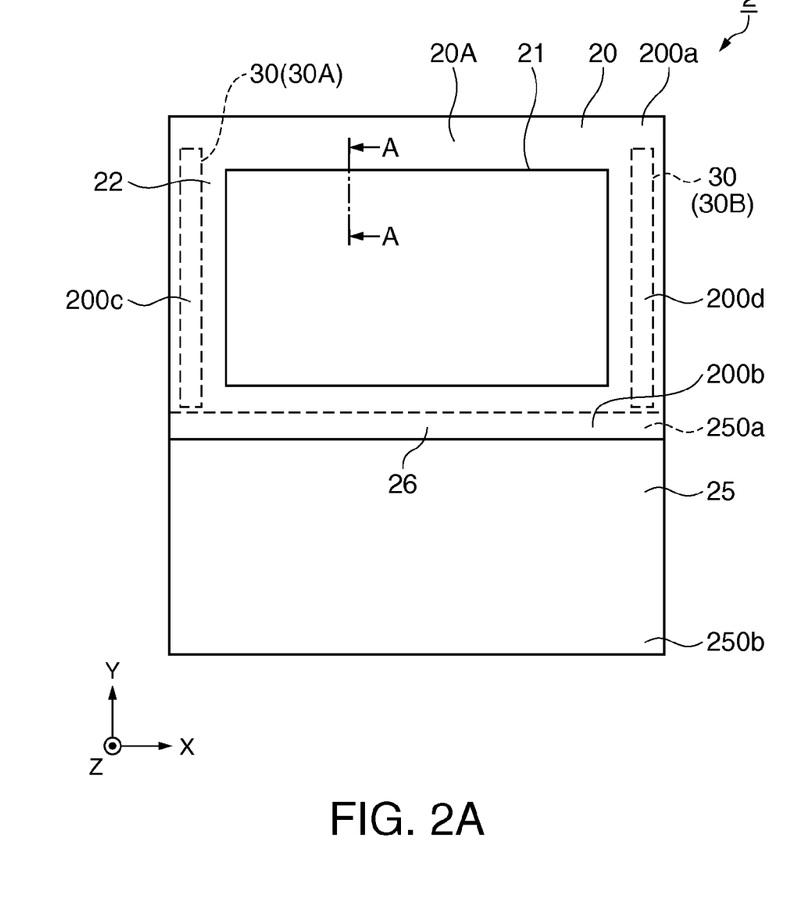
FIGS. 2A and 2B schematically illustrate a screen.
Figure 2B:
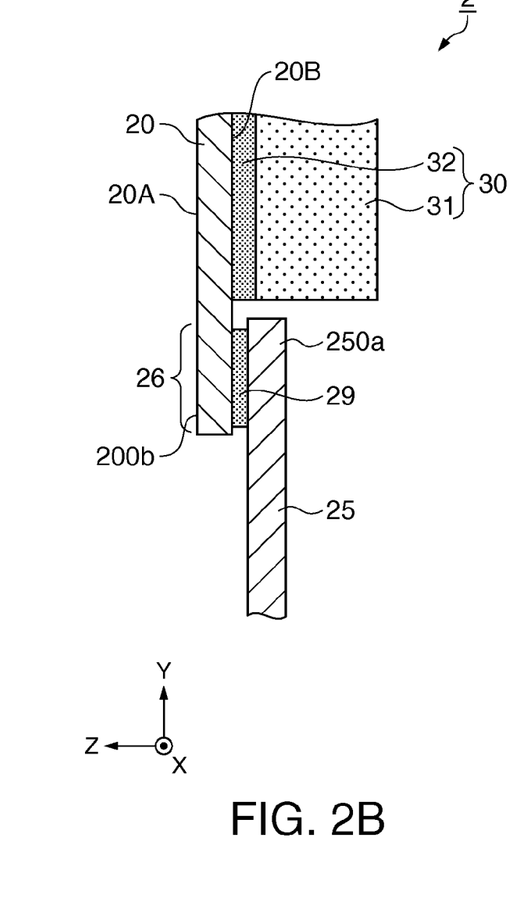
Figure 3:
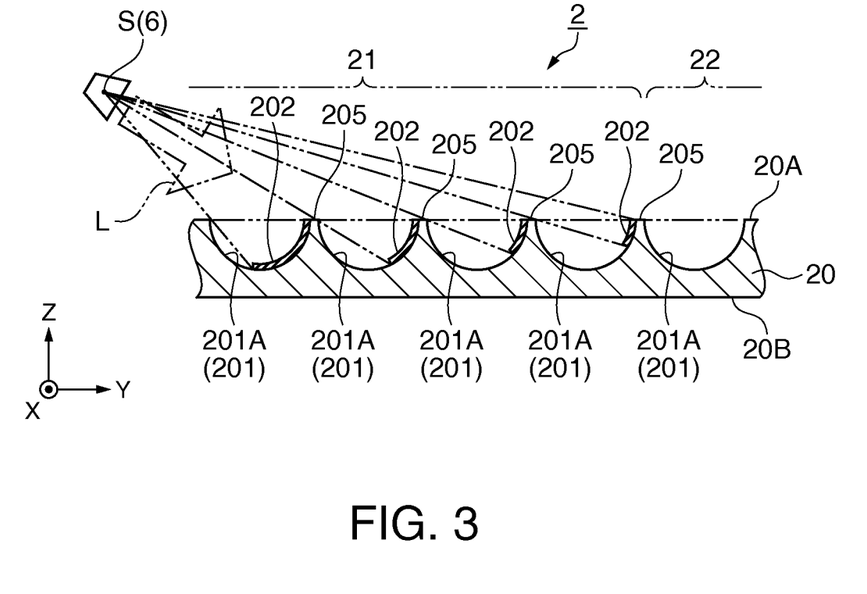
FIG. 3 is a cross-sectional view of a display area.

FIGS. 2A and 2B schematically illustrate the screen 2. FIG. 2A is a plan view of the screen 2 as viewed from the front surface 20A, while FIG. 2B is a side view of the screen 2 as viewed from the right of the screen 2. FIG. 3 is a cross-sectional view schematically illustrating a display area 21 as a figure taken along a line A-A in FIG. 2A. The structure and operation of the screen 2 according to this embodiment are now explained with reference to FIGS. 2A and 2B and 3.

The screen 2 in this embodiment is a reflection type screen which has a screen base 20 and a supplementary base 25. The screen base 20 is a flexible sheet-shaped component which reflects the projection light L for display an image thereon, whereas the supplementary base 25 is a component for extension joined to a lower end 200b of the screen base 20 corresponding to one end thereof. The supplementary base 25 is a flexible sheet-shaped component similarly to the screen base 20. The supplementary base 25 controls the height of the screen 2 so that the display area 21 (described later) of the screen base 20 of the screen unit 1 has a predetermined height.

Each of the screen base 20 and the supplementary base 25 in this embodiment is a rectangular component made of black and hard vinyl chloride resin. These bases 20 and 25 are black so as to easily absorb unnecessary incident light. As illustrated in FIG. 2A, the lengths of the screen base 20 and the supplementary base 25 are substantially equalized in the width direction (X direction) of the screen base 20 and the supplementary base 25.

As illustrated in FIG. 2A, the screen base 20 in this embodiment contains the display area 21 having a rectangular shape and disposed substantially at the center of the front surface 20A corresponding to a first surface, and a display outside area 22 disposed outside the display area 21. The display area 21 is an area which receives the projection light L from the projector 6 (see FIG. 1).

As illustrated in FIG. 3, a plurality of concaves 201 are formed throughout the area of the front surface 20A. Each of inner surfaces 201A of the concaves 201 has a substantially semispherical shape in this embodiment. The display area 21 corresponds to the range of the front surface 20A having the selected parts of the inner surfaces 201A on which a reflection film 202 is formed, so as to function as a portion for reflecting the projection light L toward the front (+Z direction).

As illustrated in FIG. 3, the concaves 201 are produced by using a transfer device (not shown) which presses a transfer die (not shown) against the screen base 20 while heating the die. More specifically, the transfer device presses a die having shapes opposite to the shapes to be formed (shapes of concaves 201) against the screen base 20 at a high pressure from both sides of the screen base 20 while heating the die, so as to allow thermal deformation (transfer) of the screen 20 along the shape of the die and obtain the necessary shape.

The reflection film 202 is formed on the front surface 20A having the concaves 201 by oblique deposition performed in such a condition that the display area 21 is exposed with the other area (display outside area 22) masked. In this case, a deposition source S is disposed substantially at the location of the projector 6 which projects the projection light L onto the front surface 20A in an oblique direction, in such a position that the center axis of the radial diffusion of aluminum or other material from the deposition source S can be almost aligned with an optical axis OA of the projection light L from the projector 6 within the Y-Z plane. By this method, the reflection film 202 in the shape corresponding to the inner surfaces 201A can be formed on the portions of the inner surfaces 201A to which the projection light L is applied, and formation of the display area 21 can thus be completed. On the other hand, no reflection film is formed on the display outside area 22 masked during deposition.

The formation of the plural concaves 201 also produces small projections 205 having convex shapes on the boundaries between the adjoining concaves 201 as illustrated in FIG. 3.

Returning to FIGS. 2A and 2B, an upper end 250a corresponding to one end of the supplementary base 25 is joined to a rear surface 20B of the screen base 20 corresponding to a second surface with an overlapping area between the supplementary base 25 and the rear surface 20B as an area of junction extending upward from the lower end 200b of the screen base 20. An adhesive is applied to the overlapping area (junction area 26) between the lower end 200b of the screen base 20 and the upper end 250a of the supplementary base 25 for junction therebetween to produce a junction layer 29 extending substantially throughout the junction area 26. According to this embodiment, the adhesive forming the junction layer 29 is constituted by an epoxy resin adhesive.

As illustrated in FIG. 2A, a pair of protection members 30 are provided on the rear surface 20B of the screen base 20 at positions opposed to the outside (display outside area 22) of the display area 21 in the width direction (X direction). Each of the protection members 30 extends through substantially the full length of the display area 21 in the winding direction (Y direction). More specifically, a protection member 30A of the protection members 30 is disposed on the rear surface 20B of the screen base 20 in the vicinity of a left end 200c, while a protection member 30B is disposed in the vicinity of a right end 200d. As can be seen from FIG. 2B, each of the protection members 30 extends from the vicinity of an end surface 25a of the upper end 250a of the supplementary base 25 to the vicinity of an upper end 200a of the screen base 20.

Each of the protection members 30 has a protection member main body 31 having a substantially rectangular parallelepiped shape, and a protection member fixing layer 32 as a junction layer between the protection member main body 31 and the rear surface 20B. Each of the protection members 30 is made of elastic material to function as a cushioning member. The protection member main body 31 in this embodiment is made of felt. The protection member fixing layer 32 in this embodiment is constituted by an adhesive double coated tape. The protection member main body 31 may be made of materials other than felt, such as nonwoven fabrics other than felt, foam synthetic resins of the polyethylene family, synthetic resins of the urethane family, and rubbers.

Returning to FIG. 1, the structure and manufacturing method of the screen unit 1 are now explained.

As noted above, the screen unit 1 includes the screen 2, the expanding and contracting mechanism 4, the winding mechanism 5, the projector 6, and the housing 7. The housing 7 is a rectangular parallelepiped and box-shaped component. The projector 6 is mounted at the center of an upper surface 7a of the housing 7 with a projection lens 61 of the projector 6 facing to the rear. There is further provided an opening 71 in the rear region of the upper surface 7a of the housing 7, as an opening through which the screen 2 is drawn upward for use, and wound toward the inside of the housing 7 for storage.

The winding mechanism 5 is disposed within the housing 7. The winding mechanism 5 is a unit which contains a spring roll 50. The spring roll 50, to which a lower end 250b (see FIG. 2A) of the screen 2 (supplementary base 25) corresponding to the other end thereof is fixed, is rotatably attached to the interior of the housing 7.

The upper end 200a (see FIG. 2A) of the screen 2 (screen base 20) corresponding to the other end thereof is held by a frame 3 (described later) and fixed thereto. The fixed upper end 200a is covered by a cover 8. The respective protection members 30 provided on the rear surface 20B of the screen base 20 do not reach the upper end 200a fixed to the frame 3, and therefore not overlap with the frame 3.

The spring roll 50 constantly urges the screen 2 in the winding direction. In this case, the screen 2 is kept pulled in the up-down direction by both the frame 3 and the spring roll 50. Similarly, the screen 2 is kept tensioned in the left-right direction (X direction) by both the frame 3 and the spring roll 50 without looseness.

The expanding and contracting mechanism 4 is provided on a right side surface 7b of the housing 7. The expanding and contracting mechanism 4 has a driving unit 40 and an expanding and contracting unit 41. The frame 3 extending in the horizontal direction is attached to the tip of the expanding and contracting unit 41. The driving unit 40 includes a motor and gears, for example, and allows expansion and contraction of the expanding and contracting unit 41 in accordance with the driving of the driving unit 40. The frame 3 shifts in the up-down direction (Y direction) along with the expansion and contraction of the expanding and contracting unit 41.

According to this structure, the frame 3 moves downward in accordance with the contraction and downward shift of the expanding and contracting unit 41. With the downward movement of the frame 3, the screen 2 moves downward while wound around the spring roll 50. On the other hand, when the expanding and contracting unit 41 stretches and shifts upward, the frame 3 similarly moves upward. With the upward movement of the frame 3, the screen 2 moves upward while resisting the urging force of the spring roll 50, so as to be drawn from the spring roll 50 and expanded.

As discussed above, in the assembled condition of the screen unit 1, the optical axis OA of the projection light L supplied from the projector 6 is almost aligned with a center axis B of the screen 2 (display area 21) in the left-right direction in the Y-Z plane. In this condition, the projection light L is applied from the projector 6 to the area within the display area 21. The projection light L applied to the area within the display area 21 is efficiently reflected by the reflection film 202 of the screen 2 toward the observer positioned in front of the screen 2 (+Z direction).

Moreover, when unnecessary external light is applied to the screen 2 from a fluorescent light or the like, this light can be absorbed by the inner surfaces 201A of the concaves 201 where the reflection film 202 is not formed. Thus, the external light is not easily reflected toward the observer, wherefore the contrast performance improves.

Figure 4:
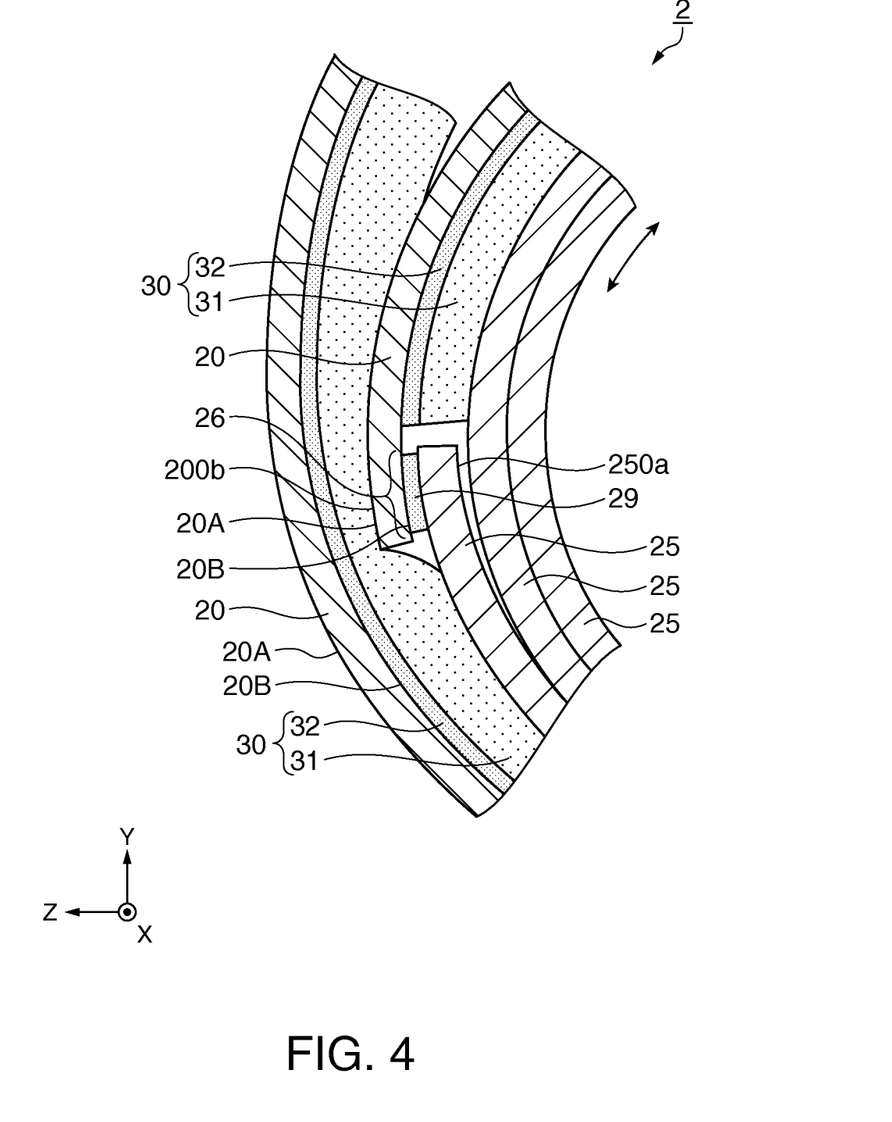
FIG. 4 is a partial cross-sectional view schematically illustrating the screen wound around a spring roll.

FIG. 4 is a partial cross-sectional view schematically illustrating the condition of the screen 2 wound around the spring roll 50. The cross section of the protection member 30 shown in FIG. 4 is taken along the Y-Z plane. The winding condition of the screen 2 is now explained with reference to FIG. 4.

As noted above, the lower end 250b of the screen 2 (supplementary base 25) is fixed to the spring roll 50. As illustrated in FIG. 4, the supplementary base 25 is initially wound around the spring roll 50, thereafter the junction area 26, and the screen base 20 are wound around the spring roll 50 in this order. In this case, the screen 2 is wound around the spring roll 50 in such a condition that the front surface 20A of the screen base 20 is positioned outside.

The front surface 20A of the screen base 20 in the area after the junction area 26 (lower end 200b) is wound not in direct contact with the rear surface 20B of the screen base 20 but in contact with the protection member 30. In other words, the screen base 20 is wound with the protection member 30 sandwiched between the front surface 20A and the rear surface 20B. In this case, damage given by the protection member main body 31 to the front surface 20A wound in contact with the protection member 30 is avoided due to elastic deformation of the protection member main body 31 of the protection member functioning as a cushioning member. Accordingly, the projections 205 (see FIG. 3) on the front surface 20A wound not in direct contact with the rear surface 20B but in contact with the protection member 30 are protected from damage.

The area including the display area 21 of the screen base 20 where the protection member 30 is not provided is wound in such a condition that a clearance corresponding the sum of the thicknesses of the pressed and elastically deformed protection member main body 31 and the protection member fixing layer 32 is secured between the rear surface 20B of the screen base 20 and the front surface 20A of the screen base 20 having been wound. Therefore, the area of the screen base 20 including the display area 21 where the protection member 30 is not provided can be similarly wound without contact between the rear surface 20B and the front surface 20A of the screen base 20.

When the screen 2 wound around the spring roll 50 is expanded, the protection members 30 return to the original shape (thickness) by their restoring force.

According to the forgoing embodiment, the following advantages can be offered.

The screen 2 in this embodiment has the display area 21 on the front surface 20A, and the protection members 30 on the rear surface 20B in the area corresponding to the outside of the display area 21 in the width direction. The display area 21 contains the reflection film 202 for reflecting the projection light L. The protection members 30 extend substantially through the full length of the display area 21 in the winding direction. The upper end 250a of the supplementary base 25 is connected with the lower end 200b of the screen base 20. The screen 2 is wound such that the front surface 20A of the screen base 20 is positioned outside. According to this structure, the protection members 30 are sandwiched between the front surface 20A and the rear surface 20B when the screen 2 (screen base 20) is wound. More specifically, the portion of the front surface 20A corresponding to the display outside area 22 is wound in contact with the protection members 30. On the other hand, the display area 21 of the front surface 20A is wound with a clearance left between the display area 21 and the rear surface 20B. In this case, contact between the display area 21 and the rear surface 20B in the winding condition is avoided, wherefore the display area 21 functioning as a portion for reflecting the projection light L can be protected from damage. More specifically, the reflection film 202 is protected from damage resulting from collapse of the shapes of the projections 205 caused by the scraping between the projections 205 and the rear surface 20B. Accordingly, the reflection film 202 can reflect the projection light L in the normal condition without causing abnormal display.

Moreover, the protection members 30 (protection members 30A and 30B) are provided on the rear surface 20B of the display outside area 22 in the vicinity of the left end 200c and the right end 200d in the width direction. Thus, the effect imposed on the front surface 20A by the existence of the protection members 30 (such as wrinkles and distortion of the front surface 20A) can be reduced to the minimum.

Furthermore, the screen 2 is wound without direct contact between the front surface 20A and the rear surface 20B. In this case, the screen base 20 is not electrostatically charged even after repetitive winding and expansion (drawing out) actions, wherefore dust contained in the use environment does not adhere to the front surface 20A and the rear surface 20B of the screen base 20. Therefore, preferable reflectance of the reflection film 202 can be maintained.

According to the screen 2 in this embodiment, the supplementary base 25 having flexibility and designed to be wound is provided at the lower end 200b of the screen base 20. Thus, the height of the display area 21 can be adjusted to a predetermined height when the screen 2 assembled to the screen unit 1 is wound or expanded.

According to the screen 2 in this embodiment, the upper end 250a of the supplementary base 25 is connected with the lower end 200b of the rear surface 20B of the screen base 20, while each of the protection members 30 is disposed in the vicinity of the end surface 25a of the upper end 250a of the supplementary base 25. According to this structure, the supplementary base 25 is not damaged by its own edge at the upper end 250a when the junction area 26 is wound subsequent to the winding of the supplementary base 25. Moreover, since each of the protection members 30 is disposed in the vicinity of the end surface 25a of the upper end 250a of the supplementary base 25, the connection area (junction area 26) between the supplementary base 25 and the screen base 20 elastically deforms the protection member 30 with a clearance left between the junction area 26 and the protection member 30 in the winding condition of the screen 2. In this case, the step produced by the junction area 26 in the thickness direction under the winding condition becomes lower, in which condition the flatness of the screen base 20 improves by reduction of bends along the step. Accordingly, distortion of the image projected on the display area 21 of the screen 2 decreases.

According to the screen 2 in this embodiment, each of the protection members 30 is made of elastic material to function as a cushioning member, and therefore can appropriately deform when the screen base 20 is wound. Consequently, problems such as damage to the front surface 20A of the screen base 20 in contact with the protection member 30 can be avoided.

According to the screen unit 1 in this embodiment which includes the winding mechanism 5 and the expanding and contracting mechanism 4, the screen 2 is drawn out and expanded for use, and wound for compact storage at the end of use. In the winding condition of the screen 2, the front surface 20A or the display area 21 of the screen base 20 is protected from damage, and sufficient flatness of the screen base 20 is maintained by reduction of bends produced by the step of the junction area 26. Thus, the screen unit 1 can reflect the projection light L in a more preferable condition.

Although the specific embodiment of the invention has been described in the foregoing detailed description, it will be understood that the invention is not limited to the embodiment disclosed herein but is susceptible to numerous modifications, improvements and the like including the following changes without departing from the spirit and scope of the invention.

According to the embodiment, the screen 2 is a reflection type screen, and each of the protection members 30 is provided on the area of the rear surface 20B corresponding to the display outside area 22 located outside the display area 21 in the width direction. However, the protection member 30 may also lie on the area of the rear surface 20B corresponding to the display area 21, and extend through substantially the full length of the display area 21 in the winding direction.

According to the embodiment, the screen 2 is a reflection type screen, and the display area 21 containing the reflection film 202 is formed on the front surface 20A of the screen base 20. However, without specific definition of the display area 21 on the front surface 20A, the reflection film 202 may be formed throughout the area of the front surface 20A of the screen base 20, rather than formed only on the limited portion of the display area 21.

According to the embodiment, the screen 2 is a reflection type screen. However, the screen 2 may be a transmission type screen which transmits projection light for display of an image. In this case, it is preferable that a transmissible surface capable of transmitting projection light for image display is provided as the display area 21 on the front surface 20A of the screen base.

The screen 2 in the embodiment includes the screen base 20 and the supplementary base 25. However, the screen may have such a structure which does not have the supplementary base 25 but has only the screen base 20 on which the protection members 30 are disposed. In this case, contact between the front surface 20A and the rear surface 20B of the screen base 20 is similarly avoided, wherefore the front surface 20A is protected from damage.

According to the screen 2 in the embodiment, each of the protection members 30 extends from the vicinity of the end surface 25a of the upper end 250a of the supplementary base 25 toward the upper end 200a of the screen base 20. However, each of the protection members 30 may be provided in the area including the junction area 26 of the supplementary area 25. When the protection member 30 is formed on the junction area 26 as well, the supplementary base 25 in the winding condition is protected from damage given by its own edge at the upper end 250a. Moreover, bends produced by the step of the junction area 26 decrease, wherefore the flatness of the screen base 20 improves.

The screen 2 in the embodiment includes the plural concaves 201. However, the shapes of the concaves 201 are not limited to concave shapes but may be other shapes such as convex shapes. In this case, the reflection film is formed on the selected portions of the outer surfaces of the convexes.

According to the screen 2 in the embodiment, the reflection film 202 is formed by deposition (oblique deposition). However, the reflection film 202 may be formed on the selected portions by sputtering or other methods instead of deposition.

While the projector 6 is included in the screen unit 1 according to the embodiment, this type of projector may be eliminated.

The entire disclosure of Japanese Patent Application No. 2011-161717, filed Jul. 25, 2011 is expressly incorporated by reference herein.

What is claimed is:

1. A screen which reflects projection light for display, comprising:
a screen base designed to be wound and including a first surface which reflects the projection light for display, and a second surface disposed on the side opposite to the first surface, the first surface including a display area and an area outside the display area; and a flexible protection member disposed on the second surface and extending through substantially the full length of the screen base in the winding direction of the screen base, wherein the flexible protection member is positioned on the second surface such that a clearance is present between at least the display area of the first surface and the second surface when the screen base is wound, wherein the flexible protection member is only disposed in an area of the second surface of the screen base opposite the area outside the display area, and wherein the first surface is positioned outside when the screen base is wound.

2. The screen according to claim 1, further comprising a flexible supplementary base designed to be wound and connected to one end of the screen base in the winding direction of the screen base.

3. The screen according to claim 2, wherein
one end of the supplementary base is connected to the one end of the second surface of the screen base; and
the protection member is disposed in the vicinity of the surface of the one end of the supplementary base.

4. A screen unit, comprising:
the screen according to claim 3;
a winding mechanism around which the screen is wound; and
an expanding and contracting mechanism which expands and contracts in cooperation with the winding mechanism to wind and draw out the screen.

5. The screen according to claim 2, wherein
one end of the supplementary base is connected to the one end of the second surface of the screen base; and
the protection member is provided on an area including the junction between the screen base and the supplementary base.

6. A screen unit, comprising:
the screen according to claim 5;
a winding mechanism around which the screen is wound; and
an expanding and contracting mechanism which expands and contracts in cooperation with the winding mechanism to wind and draw out the screen.

7. A screen unit, comprising:
the screen according to claim 2;
a winding mechanism around which the screen is wound; and
an expanding and contracting mechanism which expands and contracts in cooperation with the winding mechanism to wind and draw out the screen.

8. The screen according to claim 1, wherein the protection member is made of elastic material.

9. A screen unit, comprising:
the screen according to claim 1;
a winding mechanism around which the screen is wound; and
an expanding and contracting mechanism which expands and contracts in cooperation with the winding mechanism to wind and draw out the screen.

10. The screen according to claim 1, wherein
a plurality of concaves are disposed in the first surface; and
a reflection film is formed in selected parts on inner surfaces of the concaves.

11. A screen which reflects or transmits projection light for display, comprising:

a screen base designed to be wound and including a first surface which contains a display area that has a reflection film on which the projection light is reflected or a transmission surface through which the projection light is transmitted, and a second surface disposed on the side opposite to the first surface, the first surface including a display area and an area outside the display area; and a flexible protection member which is disposed on the portion of the second surface corresponding to the outside of the display area in the width direction of the display area, and extends through substantially the full length of the display area in the winding direction of the display area, wherein the flexible protection member is positioned on the second surface such that a clearance is present between at least the display area of the first surface and the second surface when the screen base is wound, wherein the flexible protection member is only disposed in an area of the second surface of the screen base opposite the area outside the display area, and wherein the first surface is positioned outside when the screen base is wound.

12. The screen according to claim 11, further comprising a flexible supplementary base designed to be wound and connected to one end of the screen base in the winding direction of the screen base.

13. The screen according to claim 12, wherein
one end of the supplementary base is connected to the one end of the second surface of the screen base; and
the protection member is disposed in the vicinity of the surface of the one end of the supplementary base.

14. A screen unit, comprising:
the screen according to claim 13;
a winding mechanism around which the screen is wound; and
an expanding and contracting mechanism which expands and contracts in cooperation with the winding mechanism to wind and draw out the screen.

15. The screen according to claim 12, wherein
one end of the supplementary base is connected to the one end of the second surface of the screen base; and
the protection member is provided on an area including the junction between the screen base and the supplementary base.

16. A screen unit, comprising:
the screen according to claim 15;
a winding mechanism around which the screen is wound; and
an expanding and contracting mechanism which expands and contracts in cooperation with the winding mechanism to wind and draw out the screen.

17. A screen unit, comprising:
the screen according to claim 12;
a winding mechanism around which the screen is wound; and
an expanding and contracting mechanism which expands and contracts in cooperation with the winding mechanism to wind and draw out the screen.

18. The screen according to claim 11, wherein the protection member is made of elastic material.

19. A screen unit, comprising:
the screen according to claim 11;
a winding mechanism around which the screen is wound; and
an expanding and contracting mechanism which expands and contracts in cooperation with the winding mechanism to wind and draw out the screen.

20. The screen according to claim 11, wherein
a plurality of concaves are disposed in the first surface; and
a reflection film is formed in selected parts on inner surfaces of the concaves.

* * * * *